3,232,744
PROCESS FOR PRODUCING IRON OXIDE WITH A LOW SILICA CONTENT
Eiji Munekata and Kensuke Suehiro, Tokyo, Takuya Ueda, Zushi-shi, and Taketora Kobayashi, Tokyo, Japan, assignors to The Noguchi Institute, Tokyo, Japan, an incorporated body of Japan
Filed Nov. 5, 1962, Ser. No. 235,460
Claims priority, application Japan, Nov. 16, 1961, 36/41,572
5 Claims. (Cl. 75—2)

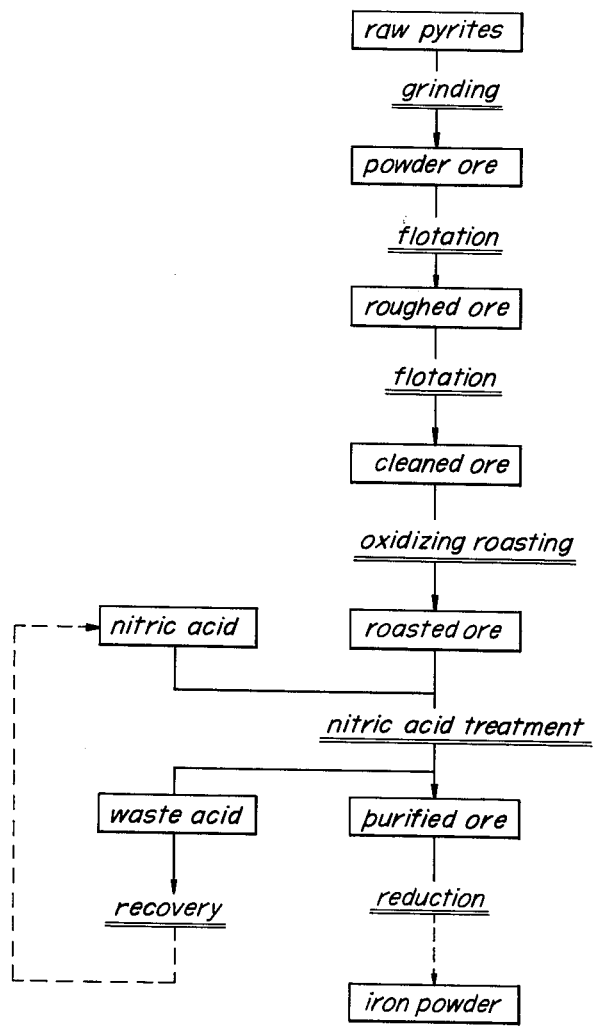

This invention relates to the production of silica- and silicate-free iron oxides of high purity from pyrites ores.

In particular, this invention relates to the production of iron oxides suitable for obtaining high-purity iron powders used in powder metallurgical application which are low in silica- and silicate-gangue from pyrites ores containing predominantly said silica- and silicate-gangue as impurities.

More particularly, this invention relates to the production of iron oxides suitable for high-purity iron powders as raw materials of powder metallurgy, high grade steels, alloys and the like. The product iron oxides contain a small amount of siliceous-gangue, non-ferrous metals such as copper, zinc, lead, etc. and other non-metallic impurities such as sulfur, phosphorus, arsenic, etc. Said production uses as raw ores pyrites containing such impurities as above mentioned in addition to the gangue impurities in which silica and silicate are predominant.

It is desirable that impurities are contained in as small amounts as possible in reduced iron powders used in powder metallurgical applications. In particular, gangue minerals containing those siliceous impurities must be removed as thoroughly as possible because such hard impurities as silica- or silicate-minerals are especially detrimental to the strength of finished product and injure moulding equipments. As reduced iron powders have been reduced from iron oxides in the solid state, impurities, in particular siliceous impurities therein, cannot be removed as slag contrary to the case where usual iron and steel are produced. Therefore high grade ores which contain as little silicate impurities as possible must be employed as raw iron ores.

Many of commercially available reduced iron powders used in powder metallurgical application are of magnetite origin and a process is now prevalent which comprises pulverizing said magnetite and magnetically separating it from the non-magnetic silicate-gangue. Although magnetite is considered readily separable from gangue by means of a magnetic separator since magnetism of magnetite differs considerably from that of gangue included therein, in many cases imperfectly liberated particles are attracted by the magnet due to the megnetism of magnetite contained therein. Therefore, it is difficult to avoid gangue particles being mixed in with pure magnetite particles, and also difficult to obtain ores which are low in siliceous impurities, for example, those containing at least less than 1% of said impurities as $SiO_2$ by mere magnetic separation when usual ores are employed. Since only those ores from particular places are now used as raw materials for producing reduced iron powders in powder metallurgical application, the minimum cost of such products are restricted. Moreover in producing iron powders from magnetite concentrates by direct reduction, it is impossible to fully remove such impurities as sulfur, phosphorus and the like. Raw ores which can be used are also limited in this respect. Because Sweden is especially rich in good raw ores, iron powders for powder metallurgical purposes are produced in great quantities in this country.

It may be thought that the quality of iron oxides such as magnetite and hematite etc. is readily improved by flotation. However this is not so, for iron oxides and their gangue minerals ore originally hydrophilic and have a similar floating property, so that it is impossible to expect such a high degree of separation that satisfies the requirements in the applications of powder metallurgy.

Pyrites ores are among the iron ores mined in practically every place of the world and cinders obtained by roasting said pyrites are also an iron oxide source readily available, but non-ferrous metallic impurities such as copper, zinc, lead and the like, or impurities such as sulfur, phosphorus, arsenic and the like are included in the cinders. One method has been used to remove said impurities which comprises treating the cinders with dilute acidic solution, for example, less than 5% solution of mineral acid such as hydrochloric acid, sulfuric acid, nitric acid and the like, but has not been satisfactory. With regard to the separation of siliceous gangue, for example, even if flotation of the cinders is carried out, it is difficult to effect a high-degree of separation like the case of iron oxide ores. Even if magnetic separation is carried out after these cinders have been reduced, the separation of the gangue is insufficient for the same reason as in the case of magnetite. As there are no effective and suitable methods, though some of them are utilized in the production of usual iron and steel, the production of pure iron powders suitable for the need of powder metallurgy has not been successful.

It is a principal object of this invention to carry out the flotation of pyrites ores before roasting. It is already well known that pyrites more readily float due to its hydrophobic property, as compared with hydrophilic siliceous-gangue. A method for enriching pyrites ores by means of the flotation are now practised in many mines. As will be mentioned herein, however, attempts were never made to produce iron oxides for pure iron powders applicable to powder metallurgy as raw materials, which are produced from high-grade pyrites containing little siliceous-gangue, for example, less than 0.5% of said siliceous-gangue as $SiO_2$, most preferably less than 0.2%, said high-grade pyrites being made by the flotation of the pyrites. When the pyrites ores are treated under appropriate conditions, it is possible to separate the high-grade pyrites ores containing, for example, less than 0.5% of the gangue as $SiO_2$, most preferably less than 0.2%, far more easily as compared with iron oxide ores. If the process is employed according to this invention which comprises starting with the pyrites ores and roasting them as they are after the flotation, iron oxides of high purity never seen before can be obtained which contain little siliceous impurities, for example, less than 0.5% of said impurities as $SiO_2$, most preferably less than 0.2%. These iron oxides can be obtained more easily than by magnetic separation of iron oxide ores or reduced iron powders without the limitation on raw ores. Contrary to the conventonal method using iron oxide ores such as magnetite and the like wherein only limited raw ores may be employed, this invention makes it possible to utilize, as raw ores, very cheap pyrites ores minted throughout the world. It should be said that the economical value of the present invention is very high and the commercial significance surprisingly great.

It is the second object of this invention to roast the above-mentioned pyrites concentrates to produce iron oxide and to refine it using nitric acid. In many cases non-ferrous metallic impurities such as copper, zinc, lead and the like and other detrimental impurities such as sulfur, phosphorus, arsenic and the like are included in the pyrites ores in addition to siliceous impurities. In order to produce purer iron powders, it is necessary to remove these impurities and refine the pyrites. Since many of these impurities show solubilities similar to that of pyrites in nitric acid, it is impossible to refine the pyrites concentrates as they are by using nitric acid. Once the pyrites concentrates are converted into iron oxides by roasting, a great difference occurs in solubility between the iron oxides and aforementioned impurities provided that the concentration and the temperature are appropriately selected in this nitric acid treatment, as described below. And then, it becomes possible to refine the iron oxide ores by nitric acid. That is to say, the iron oxides are relatively insoluble in nitric acid but non-ferrous metallic oxides such as copper, zinc, lead and the like are dissolved in nitric acid with ease. Sulfides of iron, copper, zinc, lead and the like, remaining in the ores due to incomplete oxidation in the roasting, are also decomposed and dissolved in nitric acid while desulfurization is carried out simultaneously. Phosphorus included predominantly in the form of phosphate and arsenic mainly in the form of arsenopyrite are also dissolved in nitric acid.

Contrary to this, the iron oxides are mostly dissolved in hydrochloric or sulfuric acid whereas sulfides are not dissolved in said acids to such extent, so that these acids are not suitable for high-degree purification of said iron oxides. For example, in the refining of roasted pyrites ores containing 2.20% of sulfur, when said ores were respectively treated with 15% hydrochloric acid, 30% sulfuric acid and 30% nitric acid for 3 hours, the residual sulfur was respectively 2.08%, 2.23% and 0.01%, and the amount of ore dissolved was respectively, 36.2%, 30.0% and 3.1%.

For these reasons, pyrites ores are easily purified with nitric acid by removing detrimental impurities from said pyrites ores after oxidation. This is a surprising fact, and it is indispensable for obtaining iron oxides of high purity to treat flotation concentrates by oxidative roasting and nitric acid refining in that order. This method is also considered most advantageous. This is an important discovery of the present invention and of great commercial significance.

We have made further investigations based on the above knowledge and consequently have discovered the following process. That is to say, pyrites ores which have been ground to a suitable grain size are floated and separated from gangue to produce high-grade pyrites concentrates containing little siliceous impurities in the first step without immediately roasting raw pyrites ores. The pyrites concentrates by flotation are roasted to produce iron oxides in the second step. The roasted iron oxide ores are treated with nitric acid and refined by removing impurities other than siliceous-gangue in the third step. By practising each step in turn and in skillful combinations, we have invented a process for producing iron oxide powders of high purity containing very little siliceous impurities, for example, less than 0.5% of said impurities as $SiO_2$, most preferably less than 0.2%, so that they may be employed as raw materials suitable for iron powders satisfying strict requirements in powder metallurgical application. In the process of the present invention, cheap ores mined widely in the world can be employed without limitation to the quality of raw ores, contrary to the process wherein iron oxide ores such as magnetite are used. To our knowledge such cheap ores have never been used in the conventional process and this fact provides the superiority of this invention.

The accompanying drawing is a flow diagram illustrating the improved process in accordance with the present invention.

On reducing these pure iron oxides with a gaseous, liquid or solid reducing agent, reduced iron powder suitable for powder metallurgy is obtained which contains only a small silica portion, for example, less than 0.5%, most preferably less than 0.2% of said portion as $SiO_2$.

In the flotation of the first step of this invention, the pyrites ores float easily as they differ considerably in a floating property from hydrophilic gangue minerals as illustrated above. Therefore, it is possible to separate the high-grade pyrites ores containing, for example, less than 0.5% of gangue as $SiO_2$, most preferably less than 0.2%, as compared with the iron oxide ores, provided that flotation conditions are appropriately selected such as in the degree of grinding, the concentration of a mineral solution, the class of concentration reagents, their amount added or the like.

Although finely divided ores are employed in the flotation, the degree of grinding is dependent upon the particular ore. In many cases, however, it is necessary to grind the ores to pass at least a 100-mesh screen.

It is effective to carry out the flotation in at least two steps of roughing and cleaning. The amount of the reagents used in the flotation varies depending on the quality of the feed ores, but desirably, should not be in excess in order to avoid even the slightest introduction of the gangue. The amount of less than 150 g. of a collector and less than 50 g. of a frother per ton of raw ore is sufficient in usual roughing flotation.

Among flotation agents, xanthates such as sodium or potassium salt of ethyl, propyl, butyl or amyl xanthate and aerofloats such as sodium or potassium salt of dicresyldithio-phosphoric acid etc. are used as the collector. Pine oil, camphor oil and methyl isobutyl carbinol (MIBC) etc. are used as the frother.

There is no particular limitation to the quality of the pyrites ore used in this invention. Commercially available ore containing from 40 to 46% of Fe and from 1 to 10% of $SiO_2$ may, of course, be employed. Lower-grade ore, for example, containing 30% of Fe and 25% of $SiO_2$ may also be employed. In this respect, the process of this invention has a special advantage over those processes where the iron oxide raw ores are employed and further severe limitations are placed on the quality of said raw ores.

In many cases, pyrites ores are accompanied by some metallic minerals such as copper, zinc, lead and the like. A process may also be employed which comprises carrying out a differential flotation of said metallic minerals in the flotation step of this invention, separating them from the pyrites ores and recovering them. However, these metals can be fully extracted and removed in the later refining step of nitric acid treatment.

As mentioned hereinbefore, if the flotation of the pyrites ores is carried out in accordance with the process of this invention, it is possible to obtain the high-grade concentrates containing less silica- and silicate gangue, for example, less than 0.5% $SiO_2$, less than 0.2% in good cases, which is far less than is obtained by conventional methods.

The pyrites concentrates obtained by the flotation with care, are transferred to the next roasting step where they are subjected to oxidizing roasting with air or an oxygen-containing gas passed through to produce iron oxides. In the second step of this invention, there is not much difference in roasting conditions, as compared with the conventional roasting of the pyrites ores. However too high a temperature changes copper and zinc in the ores to compounds insoluble in nitric acid. This often becomes a hindrance in later refining procedure where nitric acid is used. For example, when the roasted ores obtained by roasting the pyrites concentrates of copper content of 0.18% at a temperature of, respectively, 900, 800, 700 and 600° C. for 2 hours, were treated with nitric acid solution in concentrations of 30% at a temperature of 70° C. for 3 hours, the rate of copper removed was 41.0%, 73.6%, 85.4% and 87.7%, respectively. In the roasting step therefore, the temperature should not exceed 900° C. the maximum, and most desirably maintained below 800° C. A lower limitation to the roasting temperature is 500° C. the minimum for continuous roasting.

As a roaster, any roaster used for roasting usual pyrites powders, for example, Herreshoff multiple hearth roaster, rotary kiln, flash roaster, fluidized bed type furnace or the like may be used in the roasting procedure of this invention. Sulfur dioxide gas formed in the roasting is recovered and may be utilized for the production of sulfuric acid and other applications.

The roasted ores obtained in a manner above described are iron oxides containing very little gangue, but containing some non-metallic impurities such as sulfur, phosphorus, arsenic, etc. in addition to non-ferrous metals such as copper, zinc, lead, etc. These iron oxides cannot meet the rigid requirements needed to obtain pure iron powders if they are fed in such form to the reducing step. Therefore the iron oxides are refined with nitric acid in the third step of this invention which follows the roasting step.

Treating conditions in the nitric acid refining step vary depending on the particular impurity, its amount in the roasted ores which are to be refined in this step, and the degree of the quality required the end product. If the amount of impurities is relatively small and the requirement to the quality of the finished product is not too severe, it will be accomplished by leaching the iron oxides with a dilute solution of nitric acid, for example, in concentrations of less than 10% at room temperature. In the practice of high-grade refining however, it is better to use more concentrated nitric acid. It is desirable that the concentration of nitric acid be in the range of at least above 10%, preferably from 20 to 50%, and even higher concentrations up to about 70% may be used. A treating temperature above room temperature is favored, and a temperature above 50° C. to the boiling point of nitric acid is more effective.

Better results are obtained when treating the iron oxides at temperatures above the boiling point of the nitric acid solution, as in closed vessel under pressure, without inviting harmful effects. For example, when ores having a copper content of 0.23% were treated with the solution of nitric acid in concentrations of 30% for 3 hours at a temperature of 80° C., the remaining copper was 0.015%. Contrary to this fact, when the iron oxides are treated in the pressurized vessel, the time required to obtain the same result is shortened as the temperature is increased the time required for example is 2 hours at 160° C., 1 hour at 190° C. and 30 minutes at 230° C.

The amount of nitric acid employed varies according to the amount of impurities in the roasted pyrites ore to be refined, that is, the amount of the compounds of Cu, Zn, Pb, Co, CaO, MgO, $Al_2O_3$, etc., or those of S, P, As, etc., but an amount slightly more than the stoichiometric equivalent of the impurities is necessary. And moreover, when mixing and conveying of the mixture of ore and nitric acid by pump etc., is considered, a larger amount of nitric acid than that mentioned above is employed.

For the purpose of this invention not only freshly prepared nitric acid, but also once used and recovered nitric acid containing several impurities can be employed. For example, although the amount of impurities included in waste nitric acid varies depending on the particular ore feed and refining conditions, iron itself is sometimes contained in considerable amounts, e.g., from 5 to 100 g./liter in the form of nitrate in addition to a relatively small amount of above impurities, e.g., from 0.1 to 5 g./liter of copper and from 0.1 to 5 g./liter of zinc. In order to remove this iron, the solution of waste nitric acid is heated at a temperature between 150 and 350° C. under pressure to cause hydrolysis of the iron nitrate. 80 to 95% of the iron is precipitated as iron oxide while nitric acid is separated and recovered. This recovered nitric acid solution can be recycled and used alone or by adding additional nitric acid for adjusting the concentration.

A solution of nitric acid which contains under 10% of sulfuric acid, hydrochloric acid or salts thereof may also be used.

As mentioned above, the iron oxides obtained by the nitric acid refining contain less than 0.5% of siliceous-gangue as $SiO_2$, most preferably less than 0.2%, less than 0.1% and more preferably less than 0.05% of non-ferrous metallic impurities such as copper, zinc, lead and the like, most preferably less than 0.02% and less than 0.05% and more preferably less than 0.02% of such impurities as sulfur, phosphorous, arsenic and the like, most preferably less than 0.01%.

Thus these iron oxides, being very pure, are used satisfactorily as a pigment when ground, for example, to pass at least a 400-mesh screen.

The iron oxides are reduced below the fusion temperature of iron using the gaseous, liquid or solid reducing agent alone or in admixture to produce low silica iron powders of high purity suitable for powder metallurgy. As the reducing agent, any reducing agent which may be used in the usual direct iron production process can be used for the purpose of this invention, e.g., gaseous reducing agent such as hydrogen, carbon monoxide, a gaseous mixture of these, or gas containing hydrogen and carbon monoxide methane, other lower hydrocarbon gas, a gaseous mixture of these, or gas containing methane and other lower hydrocarbons cracked gas resulting from these hydrocarbon and the like, liquid reducing agent such as crude oil, heavy oil, light oil and the like and solid reducing agent such as coal, charcoal, coke, pitch coke and the like.

It is desirable that the reduction temperature be below the fusion temperature of iron, as required for keeping the iron in powder state. Desirably, it should also be below the temperatures where considerable sintering of iron powder is not likely to occur. The reduction is carried out desirably at temperatures between 400° C. and 1000° C. when the gaseous or liquid reducing agent is used and at somewhat higher temperatures between 700° C. and 1200° C. when the solid reducing agent is used.

As a furnace for the reduction, fluidized bed type furnace, shaft furnace, retort furnace, rotating furnace and the like can be employed regardless of their type provided that the reduced iron in powder state is obtained therein.

Where solid reducing agents are employed in obtaining the reduced iron powders, as in the above, the ashes of said reducing agents will have to be removed by magnetic separation. Where gaseous or liquid reducing agent is used, a part of gangue is separated from the iron powders. It is possible to produce iron powders containing far less silica by carrying out magnetic separation after the reduction process for removing said gangue, if necessary.

The "Pyrites" herein described include all pyrites ores such as pyrite, marcasait, pyrrhotite and the like, and the process of this invention can be applied to any of those ores or mixtures thereof. Of many pyrites ores, there are exceptions in the application of this invention. For example, some gangues, on rare occasions, have a very finely divided form of less than few microns dispersed compactly between pyrites crystals. Therefore there are some ores unsuitable for separation to a high degree. However such ores may be discerned previously by microscopic observation and have no effect on the practice of this invention.

As mentioned above in detail, the purified iron oxides obtained from the pyrites by carrying out the respective process of steps such as flotation, oxidizing roasting and nitric acid treatment in accordance with this invention, are of such high purity as not ever attained through conventional processes where pyrite cinders are used as raw materials. These iron oxides contain little siliceous gangue of less than 0.5% as $SiO_2$, most preferably less than 0.2% and little metallic impurities such as copper, zinc and the like or non-metallic impurities such as sulfur, phosphorus and the like. Therefore the quality of the reduced iron powders obtained by reducing the iron oxides according to the abovementioned method is sufficient and well comparable with that of Höganäs made sponge iron as shown in the analytical table of Example 1. Moreover, high-grade ores are not necessary in the process of this invention contrary to the case where iron oxide is employed as raw ores. For those countries which are poor in high-grade iron oxide ores but rich in pyrites ores, the merit that readily available low cost ores may be used, should not be disregarded. The commercial value of the present invention is extremely large.

The following examples according to this invention are shown.

EXAMPLE 1

1 liter of water was added to 1,000 g. of pyrites containing 33.9% of Fe, 35.6% of S and 20.3% of $SiO_2$ in a ball mill, said pyrites being ground to the size of less than 100 mesh. Then 3 liters of additional water was added to adjust the mineral solution to the concentration of 20%. 1 milliliter of 5% solution of sodium ethyl xanthate (50 g. per ton of ore) and 0.025 g. of MIBC (25 g. per ton of ore) were added as concentration reagents while carrying out flotation for 10 minutes to obtain 661 g. of rougher concentrate. As $SiO_2$ in the concentrate is still 1.4%, the concentrate was again ground to the size of less than 200 mesh. Additional water was added to lower the concentration of the mineral solution down to 5% and cleaning was carried out without adding further flotation reagents. The cleaning flotation was repeated three times to obtain 517 g. of concentrates of such grades as shown in the following table which contained 47.10% of Fe, 51.9% of S and 0.16% of $SiO_2$.

After the concentrate was filtered and dewatered, oxidizing roasting was carried out using a fluidized bed type furnace having 10 cm. in inner diameter. The concentrate was roasted with air at a flow rate of from 25 to 35 liter/min. at temperatures between 600 and 700° C. for 2 hours to obtain 364 g. of oxidized ore. This iron oxide contained 68.0% of Fe, 0.5% of residual sulfur and 0.23% of $SiO_2$ and was of a considerable high grade. But the oxide contained some detrimental impurities as seen from the table, the oxide was refined subsequently using nitric acid. That is to say, a solution of nitric acid in concentrations of 40% was added to the roasted ore in proportion of 2 liters per kg. of the ore and said ore was treated by heating at a temperature of 80° C. for 3 hours. After the treatment with nitric acid, the ore was filtered to separate out the solution of nitric acid, washed with water and dried to obtain 342 g. of purified iron oxide. This oxide having 69.0% of Fe and 0.24% of $SiO_2$ contained very little impurities such as sulfur, phosphorus, zinc, lead and the like and in fact was very pure.

This purified iron oxide could be reduced in a tubular electric furnace of 6 cm. in inner diameter with gaseous hydrogen passed through at a rate of 3 liters/min. at a temperature of 800° C. for 4 hours. 249 g. of very high-purity reduced iron powder containing 99.41% of total iron, 98.80% of metallic iron, 0.33% of $SiO_2$ and extremely small amounts of other impurities was obtained. The quality of this iron powder was quite comparable to that of Höganäs made sponge iron.

EXAMPLE 2

A liter of water was added to 1000 g. of pyrites containing 44.95% of Fe, 51.28% of S and 3.24% of $SiO_2$ and the pyrites was ground to a size of less than 100 mesh in a ball mill. 5 liters of additional water were added to adjust the mineral solution to the concentration of 14%. The flotation was carried out by adding as flotation reagents 2 milliliters of 5% solution of potassium amyl xanthate (100 g. per ton of ore) and 0.05 g. of pine oil (50 g. per ton of ore) to obtain 795 g. of rougher concentrate. Then the cleaning flotation was repeated twice in the mineral solution of almost the same concentration. 518 g. of concentrate containing 46.31% of Fe, 53.23% of S and 0.10% of $SiO_2$ was obtained.

This concentrate was subjected to fluidization roasting with air passed through at 700° C. to obtain 352 g. of oxidized ore in the same manner as described in the preceding example.

This oxidized ore was mixed with solution of nitric acid in concentrations of 30% in proportion of 1.5 liter per 1 kg. of said ore and treated with stirring in the pressurized vessel at a temperature of 160° C. for 2 hours. Subsequently the oxidized ore was filtered to separate out the solution of nitric acid, washed with water and dried to obtain 345 g. of purified iron oxide. This was very pure iron oxide containing 0.15% of $SiO_2$ and very little other impurities.

The purified iron oxide was reduced in a fluidized bed type reduction furnace with gases comprising 20% of carbon monoxide and 75% of hydrogen passed through at a flow rate of 30 liter/min. at a temperature of 900° C. for 4 hours. 241 g. of reduced iron powder was obtained This was very pure reduced iron powder which contained 98.84% of metallic iron and 0.22% of $SiO_2$ and very poor in other impurities.

In the above-mentioned process, the state of principal components varying from raw ore to reduced iron is shown in the following table and it is obvious that the effect of this invention is considerable.

| | Fe | S | Cu | Zn | $SiO_2$ | $Al_2O_3$ |
|---|---|---|---|---|---|---|
| Raw pyrites | 44.95 | 51.28 | 0.27 | 0.29 | 3.24 | 2.26 |
| Roughed ore | 45.83 | 52.46 | 0.24 | 0.25 | 0.51 | 0.47 |
| Cleaned ore | 46.31 | 53.23 | 0.18 | 0.15 | 0.10 | 0.06 |
| Roasted ore | 68.12 | 1.02 | 0.23 | 0.14 | 0.15 | 0.09 |
| Nitric acid purified ore | 69.67 | 0.065 | 0.012 | 0.015 | 0.15 | 0.02 |
| Reduced iron | 99.48 (98.84) | 0.006 | 0.018 | 0.005 | 0.22 | 0.03 |

EXAMPLE 3

To 1000 g. of pyrrhotite containing 57.32% Fe, 37.88% S and 4.20% $SiO_2$ one liter of water is added and the ore is pulverized to under 100 mesh screen size. Water is further added so that the powdered ore comprise 17% of the solution. 3 ml. of 5% potassium amyl xanthate solution (150 g. per ton ore), and 0.05 g. of Aerofloat (50 g. per ton ore) are then added, and flotation is conducted to obtain 810 g. of rougher concentrates, which still contain 0.75% of $SiO_2$. The ore solution is

*Analytical values of the product, at each step from raw ore to reduced iron powder*

| | Fe | S | As | P | Cu | Zn | Pb | $SiO_2$ | $Al_2O_3$ |
|---|---|---|---|---|---|---|---|---|---|
| Raw pyrites | 33.94 | 35.63 | 0.10 | 0.08 | 0.18 | 0.21 | 0.07 | 20.26 | 8.04 |
| Roughed ore | 46.13 | 49.78 | 0.08 | 0.07 | 0.10 | 0.14 | 0.04 | 1.45 | 0.06 |
| Cleaned ore | 47.10 | 51.90 | 0.08 | 0.06 | 0.06 | 0.06 | 0.03 | 0.16 | 0.05 |
| Roasted ore | 68.00 | 0.50 | 0.02 | 0.05 | 0.05 | 0.05 | 0.03 | 0.23 | 0.07 |
| Nitric acid refined ore | 69.00 | 0.005 | 0.002 | 0.002 | 0.005 | 0.01 | 0.005 | 0.24 | 0.05 |
| Reduced iron | 99.41 (98.80) | 0.002 | 0.001 | 0.001 | 0.007 | 0.005 | 0.007 | 0.33 | 0.07 |
| Höganäs made sponge iron | 98.8 | 0.015 | | | 0.015 | | | 0.3 | |

Value of metallic iron is shown in ( ).

lowered to 10% solids and cleaning is conducted twice to obtain 550 g. of ore of very little silicate content, namely, 0.07% $SiO_2$, 59.55% Fe and 39.00% S. The cleaned ore was roasted in a fluidized bed for 3 hours passing air at the rate of 25 cm. per second to result in 450 g. of iron oxide, which contained 69% Fe and 0.610% S. 60% nitric acid was added to the iron oxide at the rate of one liter to one kg. of ore, heated to 70° C. for 2 hours under stirring and subsequently filtered and separated. 425 g. of purified iron oxide was obtained after washing, drying etc. The resultant product, containing 69.70% Fe, 0.08% $SiO_2$, etc., is markedly free from other impurities and is amply sufficient as sponge iron material for powder metallurgical purposes.

|  | Fe | S | Cu | Zn | $SiO_2$ | $Al_2O_3$ |
|---|---|---|---|---|---|---|
| Raw pyrrhotite | 57.32 | 37.88 | 0.20 | 0.21 | 4.20 | 0.22 |
| Roughed ore | 58.72 | 38.11 | 0.08 | 0.09 | 0.75 | 0.07 |
| Cleaned ore | 59.55 | 39.00 | 0.05 | 0.05 | 0.07 | 0.06 |
| Roasted ore | 69.00 | 0.610 | 0.07 | 0.07 | 0.09 | 0.08 |
| Nitric Acid refined ore | 69.70 | 0.008 | 0.010 | 0.012 | 0.08 | 0.02 |

What we claim is:

1. A process for producing high-purity iron oxide free of siliceous gangue and other impurities, from pyrites ore containing as impurities said siliceous gangue, non-ferrous metals of copper, zinc and lead, and non-metals of sulfur, phosphorus and arsenic which comprises grinding raw pyrites ore, floating the ground ore in at least two steps comprising roughing flotation carried out by the use of less than about 150 grams of collector and less than about 50 grams of a frother per ton of raw ore and cleaning flotation to remove said gangue to produce pyrite concentrate containing less than 0.5% siliceous gangue, oxidatively roasting the flotation concentrate at a temperature of 500° C. to 900° C. to produce ironoxide, treating said roasted ore with nitric acid solution of 10–70% concentration at a temperature of 50° C. to the boiling point of nitric acid to purify said iron oxide by dissolving out said non-ferrous metals and said nonmetals, while leaving said iron oxide substantially undissolved and thereafter separating the thus-purified iron oxide from said nitric acid solution, washing and drying said iron oxide.

2. A process for obtaining iron oxide suitable for the production of high-purity iron powder having a silica- and silicate-gangue content of less than 0.5%, a copper content of less than 0.1%, a zinc content of less than 0.1%, an arsenic content of less than 0.05%, a sulfur content of less than 0.05% and a phosphorus content of less than 0.05%, from pyrites ore containing predominantly silica- and silicate-gangue and a small amount of nonferrous metals of copper, zinc and lead and of non-metals of sulfur, phosphorus and arsenic which comprises grinding raw pyrites ores to the size of less than 100 mesh, floating the ground ores in at least two steps comprising roughing flotation carried out by maintaining said ore at a maximum concentration of 20% in the flotation liquid and by the addition to said liquid of less than about 150 grams of a collector and less than about 50 grams of a frother per ton of raw ore and cleaning flotation carried out by maintaining the concentration of said ore at a maximum concentration of 14% to remove said gangue to produce pyrite concentrate containing less than 0.5% siliceous gangue, oxidatively roasting the flotation concentrates at a temperature of 500° C. to 900° C. to produce iron oxides, treating said roasted ore with nitric acid solution of 10–70% concentration at a temperature of 50° C. to the boiling point of nitric acid to purify said iron oxide by dissolving out said non-ferrous metals and said non-metals, while leaving said iron oxide substantially undissolved, and thereafter separating the thus-purified iron oxide from said nitric acid solution, washing and drying said iron oxide.

3. A process for obtaining iron oxide suitable for the production of high-purity iron powder having a silica- and silicate-gangue content of less than 0.5%, a copper content of less than 0.1%, a zinc content of less than 0.1%, an arsenic content of less than 0.05%, a sulfur content of less than 0.05% and a phosphorus content of less than 0.05%, from pyrites ore containing predominantly silica- and silicate-gangue and a small amount of nonferrous metals of copper, zinc and lead and of nonmetals of sulfur, phosphorus and arsenic which comprises grinding raw pyrites ores to the size of less than 100 mesh, floating the ground ores in at least two steps comprising roughing flotation carried out by maintaining said ore at a maximum concentration of 20% in the flotation liquid and by the addition to said liquid of less than about 150 grams of a collector and less than about 50 grams of a frother per ton of raw ore and cleaning flotation carried out by maintaining the concentration of said ore in the liquid at about 5% to 14% and without adding a further quantity of collector and of frother, to remove said gangue to produce pyrite concentrate containing less than 0.5% siliceous gangue, oxidatively roasting the flotation concentrates at a temperature of 500° C. to 900° C. to produce iron oxides, treating said roasted ore with nitric acid solution of 10–70% concentration at a temperature of 50° C. to 350° C. under pressure to purify said iron oxide by dissolving out said non-ferrous metals and said non-metals, while leaving said iron oxide substantially undissolved, and thereafter separating the thuspurified iron oxide from said nitric acid solution, washing and drying said iron oxide.

4. In a process for producing pure iron oxide by grinding pyrite ore containing siliceous gangue, non-ferrous metals of copper, zinc and lead and non-metals of sulfur, phosphorus and arsenic, floating the ground ore, then oxidatively roasting the pyrite concentrate and extracting iron oxide, an improvement to obtain iron oxide suitable for producing a high purity iron powder having less than 0.5% of a siliceous content of $SiO_2$, less than 0.1% of copper, less than 0.1% of zinc, less than 0.05% of arsenic, less than 0.05% of sulfur and less than 0.05% of phosphorus, which comprises carrying out roughing flotation by adding to the flotation liquid less than about 150 grams of collector per ton of raw ore and less than about 50 grams of frother per ton of raw ore, and maintaining the concentration of ore in the liquid at a maximum of 20%, and then carrying out cleaning flotation by controlling the concentration of said ore in the liquid at a maximum of about 15% to obtain concentrate containing less than 0.5% of siliceous gangue as $SiO_2$, and then oxidatively roasting the concentrate at a temperature of 500° C. to 900° C. to produce iron oxide, thereafter treating said roasted ore with a nitric acid solution of 10–70% concentration at a temperature from 50° C. to 350° C. to purify said iron oxide by dissolving out said non-ferrous metals and said non-metals while retaining said iron oxide substantially undissolved, and then separating the purified iron oxide from the nitric acid solution.

5. A process according to claim 1, wherein said nitric acid is recovered and recycled through said oxides after removing a portion only of said impurities therefrom and adjusting the concentration of said nitric acid.

References Cited by the Examiner

UNITED STATES PATENTS

| 2,677,608 | 5/1954 | McKay et al. | 75—6 |
| 2,719,082 | 9/1955 | Sproule et al. | 75—1 |
| 2,746,856 | 5/1956 | Mancke | 75—1 |
| 2,916,357 | 12/1959 | Schaufelberger | 75—101 |

FOREIGN PATENTS

| 530,842 | 9/1956 | Canada. |
| 592,684 | 2/1960 | Canada. |

BENJAMIN HENKIN, *Primary Examiner.*